(12) United States Patent
Vonmetz et al.

(10) Patent No.: US 11,068,675 B2
(45) Date of Patent: Jul. 20, 2021

(54) HIGHLY EFFICIENT AND EYE-SAFE ILLUMINATION UNIT FOR A BARCODE READER

(71) Applicant: Datalogic IP Tech S.R.L., Calderara di Reno Bologna (IT)

(72) Inventors: Kurt Vonmetz, Bologna (IT); Federico Canini, Bologna (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 0 days.

(21) Appl. No.: 15/832,387

(22) Filed: Dec. 5, 2017

(65) Prior Publication Data
US 2019/0171854 A1    Jun. 6, 2019

(51) Int. Cl.
*G06K 7/10* (2006.01)
*G06K 7/14* (2006.01)

(52) U.S. Cl.
CPC ..... *G06K 7/10722* (2013.01); *G06K 7/10732* (2013.01); *G06K 7/1413* (2013.01); *G06K 2007/10485* (2013.01); *G06K 2007/10524* (2013.01)

(58) Field of Classification Search
CPC ............. G06K 7/10722; G06K 7/1413; G06K 2007/10524
See application file for complete search history.

(56) References Cited

U.S. PATENT DOCUMENTS

| | | | |
|---|---|---|---|
| 3,676,667 A | 7/1972 | Malifaud | |
| 7,976,204 B2 | 7/2011 | Li et al. | |
| 8,030,630 B2 | 10/2011 | Tan et al. | |
| 9,536,124 B1* | 1/2017 | Nunnink | G06K 7/10831 |
| 2006/0131419 A1* | 6/2006 | Nunnink | G06K 7/10732 235/472.02 |
| 2007/0291491 A1* | 12/2007 | Li | G02B 6/0008 362/307 |
| 2010/0111361 A1* | 5/2010 | Tan | G06K 7/10732 382/103 |
| 2012/0121245 A1* | 5/2012 | Messina | G02B 19/0004 396/199 |
| 2016/0299288 A1* | 10/2016 | Angelini | G02B 6/0008 |
| 2018/0352060 A1* | 12/2018 | Gifford | H04M 1/0264 |
| 2019/0191133 A1* | 6/2019 | Ostrow | H04N 9/3158 |

FOREIGN PATENT DOCUMENTS

| | | | |
|---|---|---|---|
| CA | 2348386 | 5/2000 | |
| WO | WO-2016127145 A1 * | 8/2016 | G02B 6/0008 |

OTHER PUBLICATIONS

RLT LEDs, http://wavien.com, printed Dec. 5, 2017.
EX25 Near/Far 2D Imager Engine Product Specification Sheet, Intermec by Honeywell, printed on Dec. 5, 2017, 2 pages.
Zebra SE4600LR Product Spec Sheet, Zebra Technologies, printed on Dec. 5, 2017, 3 pages.

* cited by examiner

*Primary Examiner* — Sonji N Johnson
(74) *Attorney, Agent, or Firm* — Foley & Lardner LLP

(57) ABSTRACT

A system and method of imaging barcodes may include generating a first light beam from an illumination surface having first dimensions. The first light beam may be directed into an input aperture of an optical component to form a second light beam. The input aperture has second dimensions, where the first dimensions are at least as large as the second dimensions. The second light beam having irradiation spatially distributed across the second light beam may be projected to read a machine-readable indicia.

20 Claims, 18 Drawing Sheets

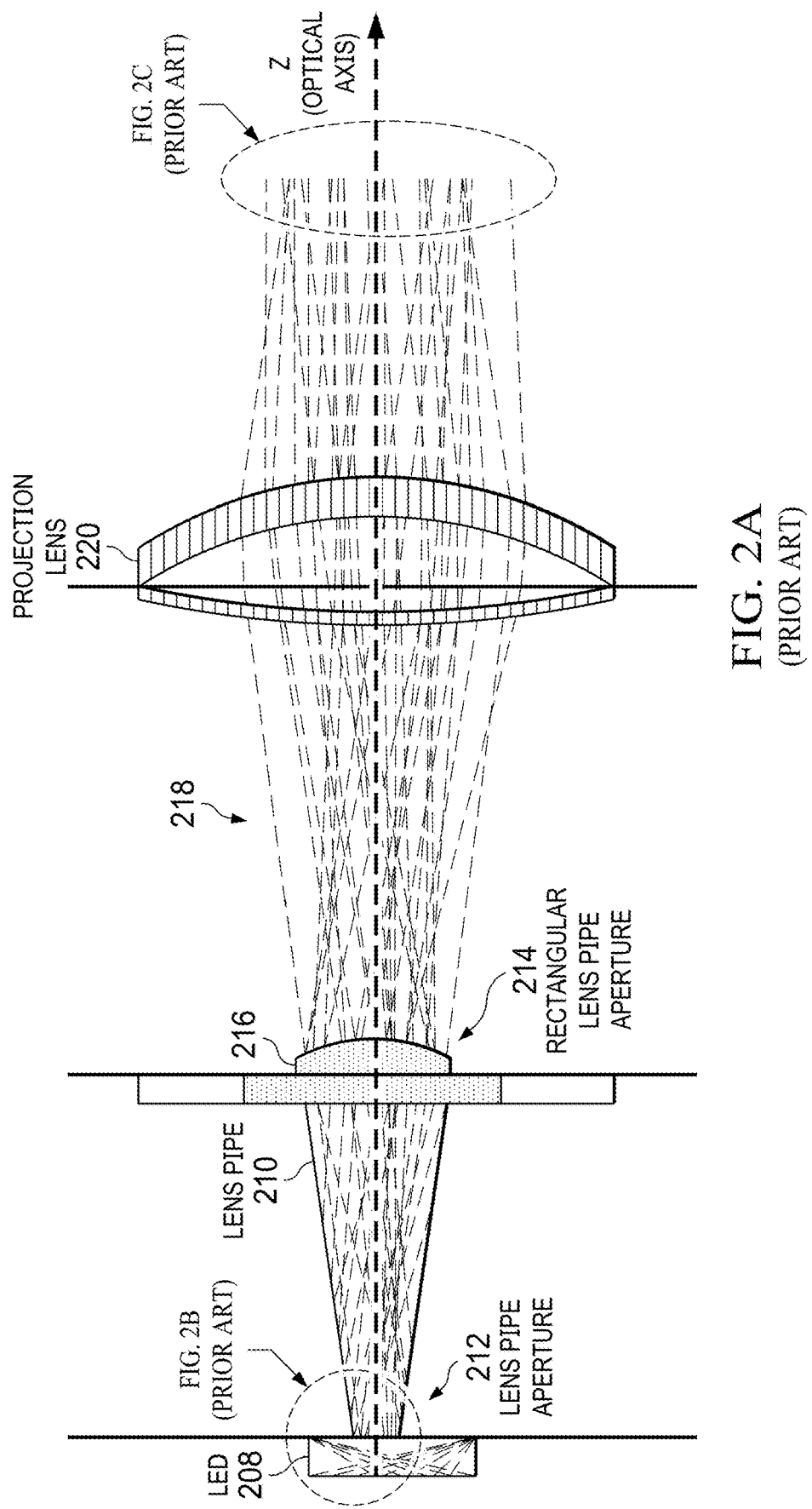

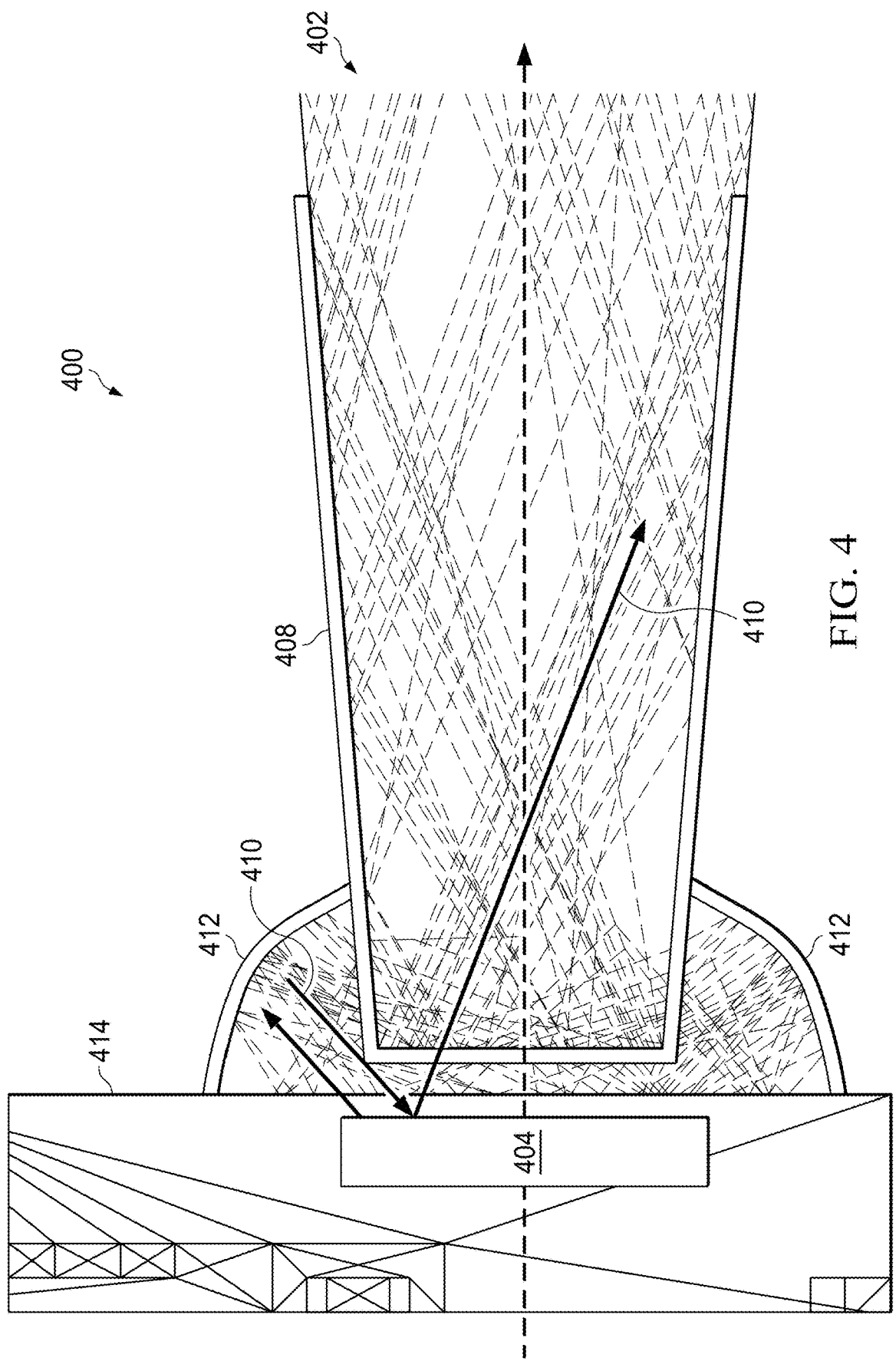

HIGHLY EFFICIENT AND EYE-SAFE ILLUMINATION UNIT FOR A BARCODE READER

FIELD OF THE INVENTION

The present invention relates to barcode readers, and more specifically, to barcode readers having a highly efficient and eye-safe illumination unit.

BACKGROUND OF THE INVENTION

Barcode readers are pervasively used these days due to improving efficiency in a wide range of consumer and industrial applications. Some barcode readers support consumer activities, such as identifying goods at a point-of-sale (POS) in retail stores, while other barcode readers support logistics and inventory efforts of commercial operations, such as shipping and warehousing. For the industrial operations, certain barcode readers are used for reading machine-readable indicia (e.g., barcodes) at long-distances (e.g., 2 m or more), such as in the case of reading machine-readable indicia positioned on containers or boxes on warehouse shelves. Many other applications for using barcode readers for reading machine-readable indicia at long distances also exist.

Barcode readers with long-distance range capabilities use high-efficient light beams at narrow angles (e.g., 14° full horizontal) from light emitting diode (LED) light sources. Power of the light source is relatively high compared with other barcode readers so as to effectively read barcodes at long range.

Eye safety is always a concern when using LEDs for barcode scanning, especially when long distance barcode readers are used in a handheld mode. One problem that exists with conventional barcode readers that are used at long range is that the light beams projected from the readers have peak irradiance in discrete light spots that can cause damage to a retina of an eye. Such irradiance peaks result from a configuration of the optical system. As a result, a new optical system design for a barcode reader is needed to produce high efficient light for reading machine-readable indicia at long distances that also prevents eye injury.

BRIEF SUMMARY OF THE INVENTION

A barcode reader that includes an optical system that includes a light source, such as an LED chip, that is as large or larger in dimension than an input aperture to a tapered lens pipe may be used to produce a light beam (e.g., rectangular shaped light beam) with homogeneous distributed irradiance so as to provide for long range barcode reader that is eye safe. To increase efficiency, reflectors may be used to reflect light that does not enter the input aperture back to the light source for at least partial reflectance into the input aperture of the lens pipe. The tapered lens pipe may have an output surface opposite the input aperture, and may be configured to provide optical power and increase uniformity of a projected pattern. The output aperture over which the output surface is disposed may be rectangular so as to produce sharp edges for reading machine-readable indicia with high resolution. A projection lens may be disposed at a distance from the output aperture to project light along an optical axis. Overall irradiance from the optical system may be substantially the same as overall irradiance of conventional optical systems, but irradiance may be evenly distributed across an output light beam, which reduces peak irradiance output by a factor of seven (i.e., 7×) or more.

One embodiment of a barcode reader may include an illumination source having an illumination surface that illuminates from a surface area with first dimensions. A lens pipe having a tapered shape extending from a first end to a second end, where the first end defines an input aperture having second dimensions that at most equal to the first dimensions. A projection lens may be disposed in front of the second end of the lens pipe, and be configured to project the light from the illumination source that enters the input aperture of the lens pipe substantially along an optical axis defined by the projection lens.

One embodiment of a method of imaging barcodes may include generating a first light beam from an illumination surface having first dimensions. The first light beam may be directed into an input aperture of an optical component to form a second light beam. The input aperture has second dimensions, where the first dimensions are at least as large as the second dimensions. The second light beam having irradiation spatially distributed across the second light beam may be projected to read a machine-readable indicia.

BRIEF DESCRIPTION OF THE DRAWINGS

Illustrative embodiments of the present invention are described in detail below with reference to the attached drawing figures, which are incorporated by reference herein and wherein:

FIGS. 2A-2C are illustrations of an illustrative prior art illumination source that produces a light beam with multiple spots with high irradiance that are potentially harmful to a human eye;

FIG. 4 is another illustration of an illustrative optical path of a portion of an illumination unit that generates high efficient illumination with evenly distributed irradiance to be projected from a barcode reader;

DETAILED DESCRIPTION OF THE INVENTION

Figure 1A:
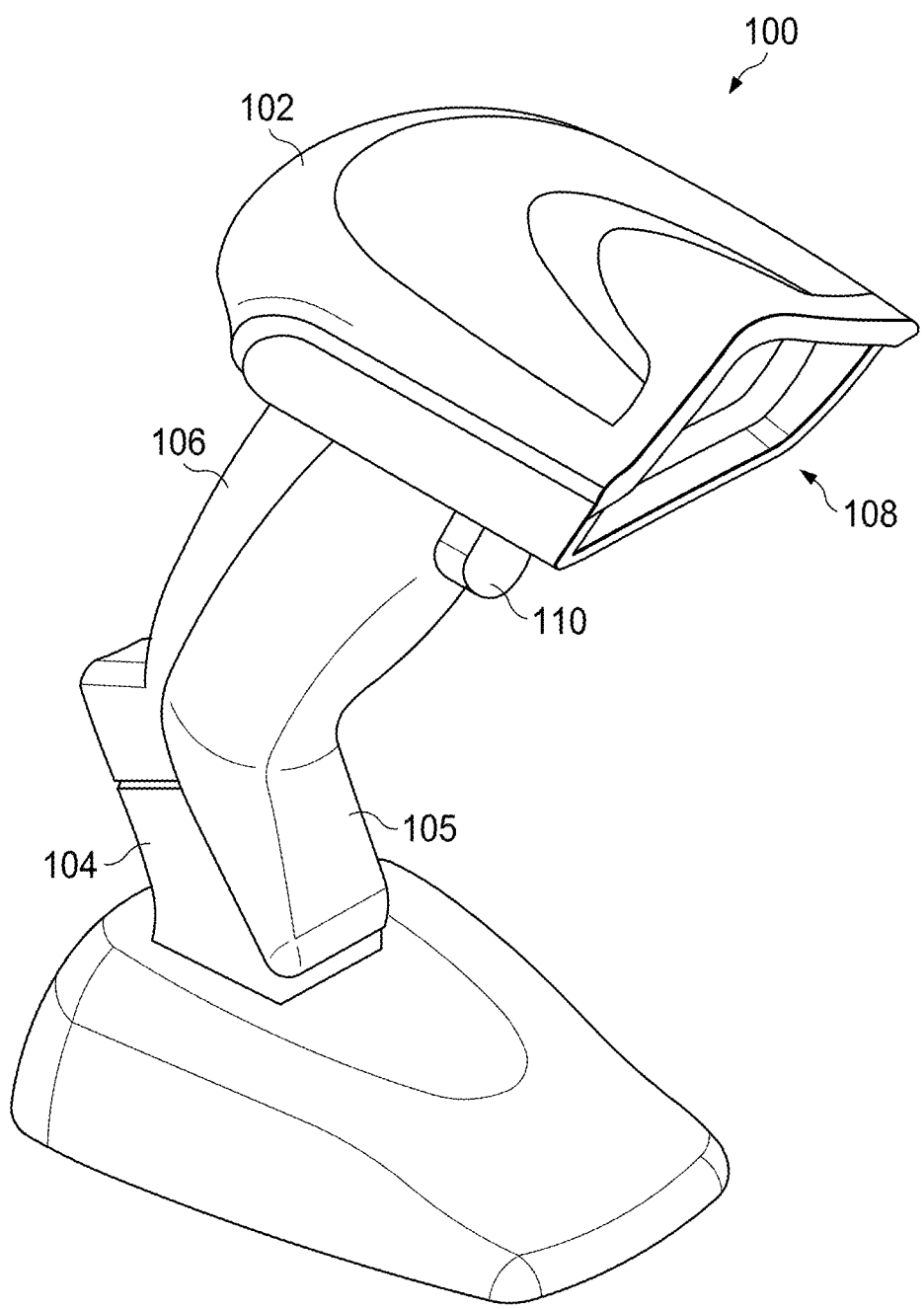
FIGS. 1A and 1B are illustrations of an illustrative barcode reader system configured to read machine-readable indicia at long distances using a high efficient and eye safe illumination unit.
Figure 1B:
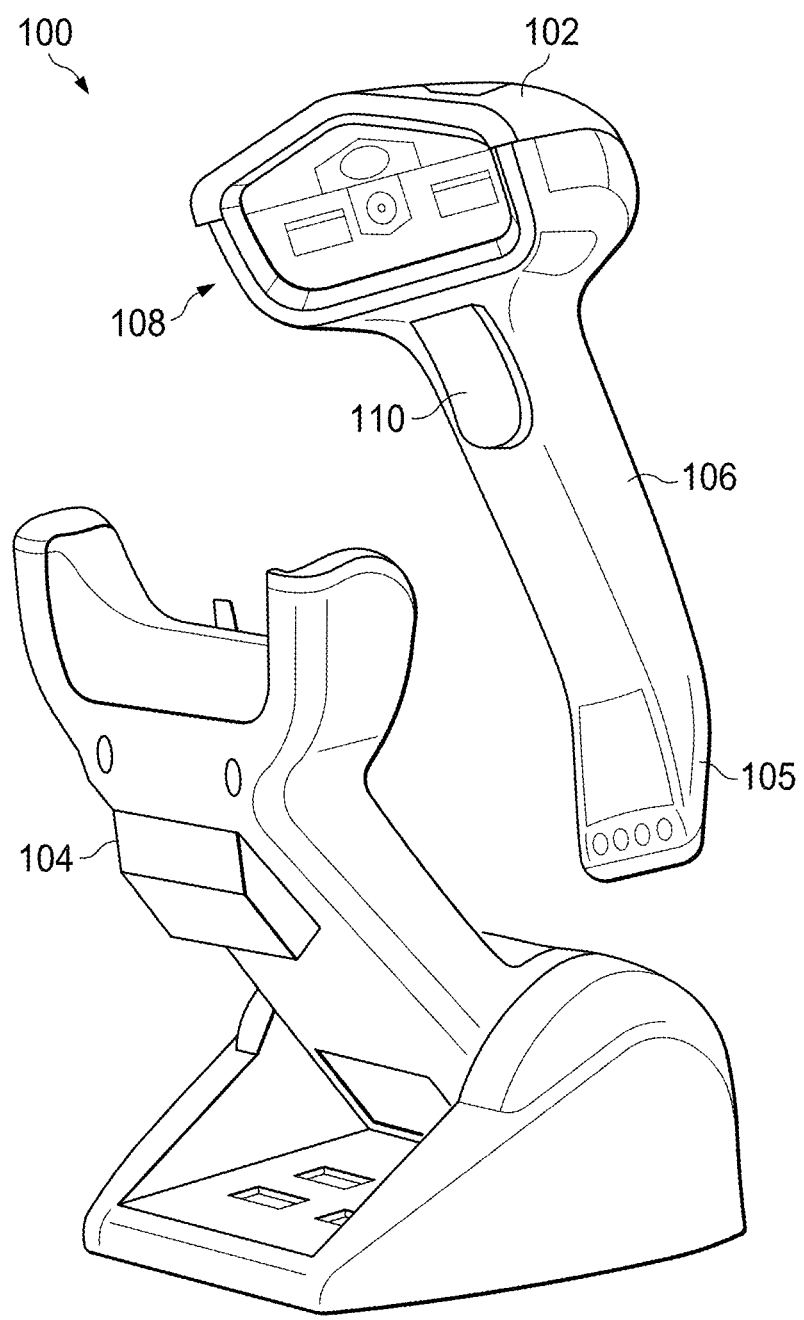
Figure 11:
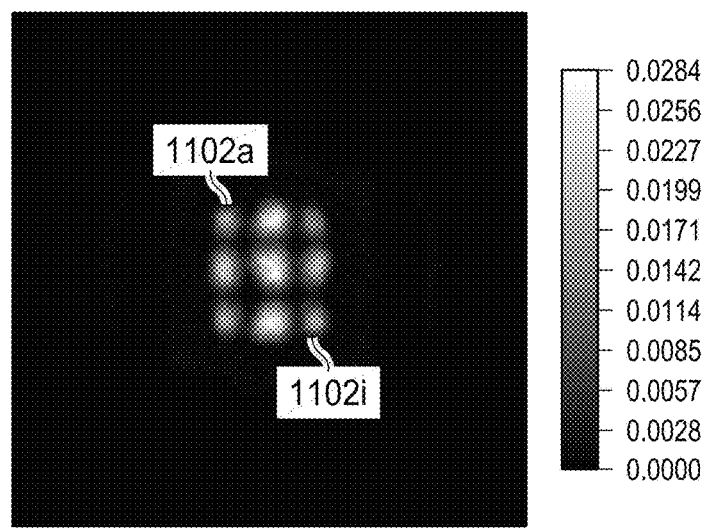
FIG. 11 is an intensity map of illustrative light projected from a prior art illumination unit as would be seen by a human eye.
Figure 12:
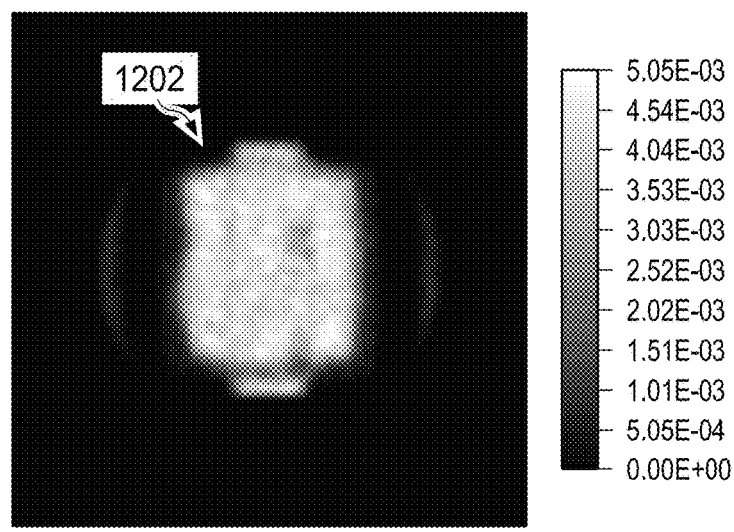
FIG. 12 is an intensity map of illustrative light projected from an illumination unit as described herein as would be seen by a human eye.

With regard to FIGS. 1A and 1B, illustrations of an illustrative barcode reader system 100 configured to read machine-readable indicia at long distances using a high efficient and eye safe illumination unit are shown. The barcode reading system 100 may include a reader head 102 that includes the illumination unit that is efficient and produces a rectangular illumination region with homogeneous illumination that produces distributed irradiance within the rectangular illumination region. The homogenous irradiance has comparable total energy within the rectangular illumination region, but has significantly reduced or eliminated spots of high irradiance within the rectangular illumination region (compare. FIGS. 11 and 12, for example). The barcode reading system 100 is handheld, and may include a base 104 that may be used to charge a battery (not shown) of the barcode reader 100 via a base 105 of a hand grip 106, as understood in the art. The reader head 102 is shown to have a window 108 via which one or more light beams are output and via which images may be captured by an image sensor or scans may be captured by an optical detector. As shown, the hand grip 106 may also include a trigger 110 that enables a user to trigger the barcode reader 100 to generate the rectangular illumination region to read a machine-readable indicia from a long distance (e.g., 10 meters or more). In an embodiment, because the rectangular illumination region may also be used at shorter ranges, such as 20 cm, and be capable of reading high resolution machine-readable indicia.

Figure 2B:
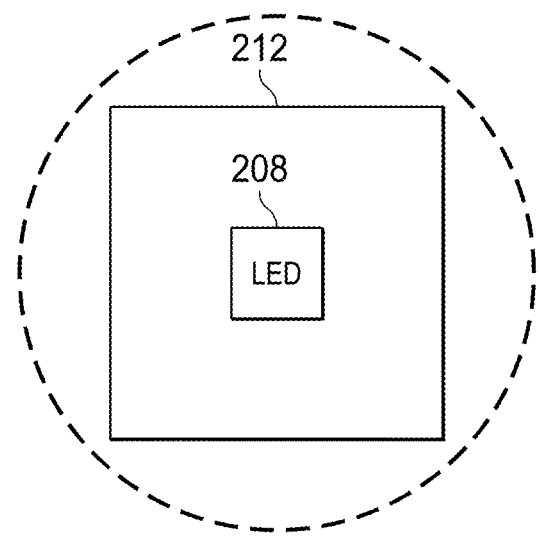
Figure 2C:
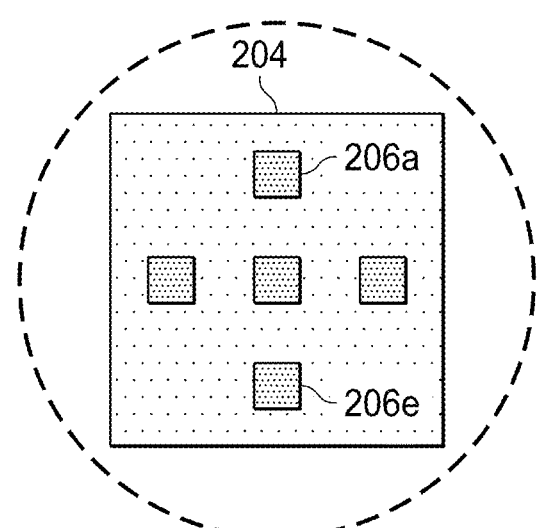

With regard to FIGS. 2A-2C, illustrations of an illustrative prior art illumination unit 200 that produces a light beam 202 in the shape of a light region 204 with multiple light spots 206a-206e (collectively 206) with high levels of irradiance that are potentially harmful to a retina of a human eye are shown. The prior art illumination unit 200 has an illumination source 208, such as an LED chip, and a lens pipe 210. In an embodiment, the illumination source 208 may have an illumination surface area of 1×1 mm, and a chip package of 2 mm×3 mm. Other dimensions are possible, as well. The lens pipe 210 has an input aperture 212 and an output aperture 214. In an embodiment, the input aperture 212 may be rectangular or optionally square to match an LED chip shape that is typically square. The output aperture 214 may be rectangular to define a projected pattern format that is rectangular. It has been discovered that the reason for formation of the high energy light spots 204 is that dimensions of an illumination source 208 are smaller than the input aperture 212 of the light pipe 210, thereby causing the multiple light spots 206 with high irradiance to form.

Figure 3:
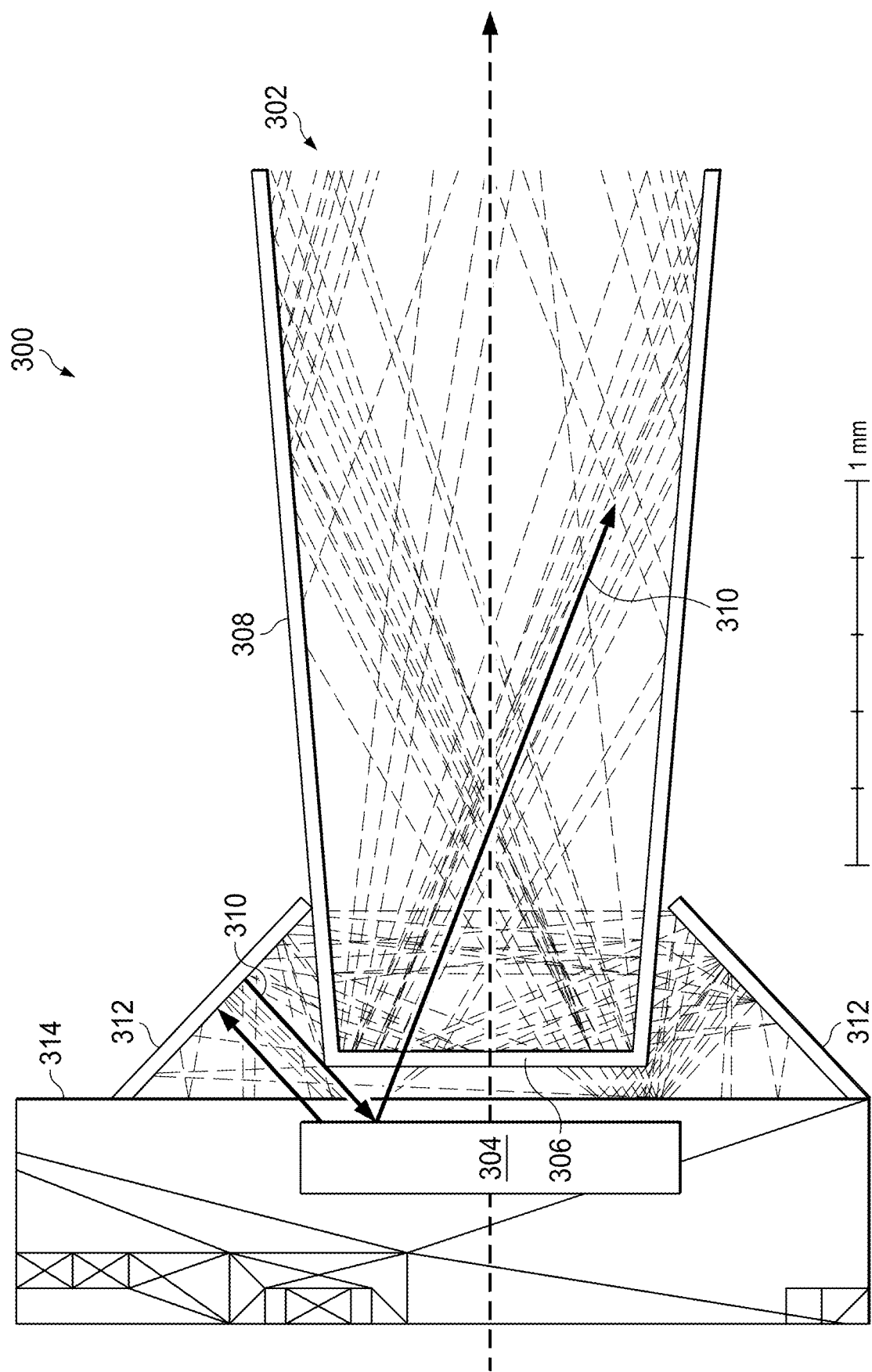
FIG. 3 is an illustration of an illustrative optical path of a portion of an illumination unit that generates high efficient illumination with evenly distributed irradiance to be projected from a barcode reader.

With regard to FIG. 3, an illustration of a portion of an illustrative illumination unit 300 that forms an optical path 302 that generates high efficient and eye safe illumination to be projected from a barcode reader is shown. The illumination unit 300 includes an illumination source 304, in this case an LED chip, that generates illumination or light beams from a surface of the illumination source 304. Dimensions of the surface of the illumination source 304 that the produces light beams are shown to be as large as or larger than an input aperture 306 of a lens pipe 308. Light beams 310 represent only beams of light that are reflected from reflectors 312 that are disposed adjacent to the lens pipe 308. It should be understood that light beams from the LED chip 304 that directly enter the aperture 306 of the lens pipe 308 are not shown in FIG. 3, but that a majority of the light beams produced by the illumination source 304 would typically enter the input aperture 306 of the lens pipe 308 if positioned sufficiently close to the aperture 306. The reflectors 312 are planar, and are angled in such a manner as to reflect the light beams 310 back to a surface of the illumination source 304 (or a reflective packaging surface that covers the surface) that has some level of reflectance (e.g., at least 80% reflective). The reflectors 312 may be connected to LED packaging 314 and lens pipe 308, thereby preventing light from exiting the illumination unit 300 other than through the lens pipe 308. Efficiency is increased the closer the illumination source 304 is positioned to the aperture 306, but physical constraints that limit the positioning exist.

By using reflectors 312, light that does not directly enter the input aperture 306 can be reflected back into the input aperture 306, thereby increasing efficiency of the illumination unit 300. Efficiency may be defined as light that is output from the illumination source 304 relative to light that enters the input aperture 306. It has been simulated and measured that such a configuration increases efficiency of the illumination unit 300 to be upwards of 40% or more, whereas efficiency without the reflectors 312 would be about 32%, which is significant for long distance reading of machine-readable indicia, as understood in the art. It should be understood that these efficiency values are illustrative, and that alternative efficiencies, higher or lower, may result in practice, as well. However, the use of the reflectors 312 improves efficiency of the illumination unit, which improves the overall efficiency and quality of the barcode reader. The reflected light beams 310 are blended into other light signals that directly enter the aperture 306, and the reflected light beams 310 have been found to not form light spots as produced by conventional barcode readers (compare FIGS. 11 and 12, for example). As shown, the reflectors 312 are planar, which (i) has been found to be sufficiently effective in increasing efficiency of the illumination unit 300 and (ii) leads to a more reliable and more simple manufacturing process.

With regard to FIG. 4, an illustration of a portion of an alternative illustrative illumination unit 400 that forms an optical path 402 that generates high efficient and eye safe illumination to be projected from a barcode reader is shown. The illumination unit 400 includes each of the same components as the illumination unit 300, including an illumination source 404 with dimensions at least as large or larger than an input aperture 406 of a lens pipe 408. The illumination unit 400 includes reflectors 412 that are disposed adjacent to the lens pipe 408. The reflectors 412 in this configuration are concave, and are oriented and configured in such a manner as to reflect the light beams 410 back to a surface of the illumination source 404 or package 414 of the illumination source 404 that has some level of reflectance (e.g., above about 30% reflectance). In an embodiment, the reflectors 412 may be connected to the LED packaging 414 and lens pipe 408, thereby preventing light from exiting the illumination unit 400 other than through the lens pipe 408. While the reflectors 412 may provide an increase in efficiency, the ability and cost to produce the planar reflectors 312 may outweigh the increased efficiency.

Figure 5A:
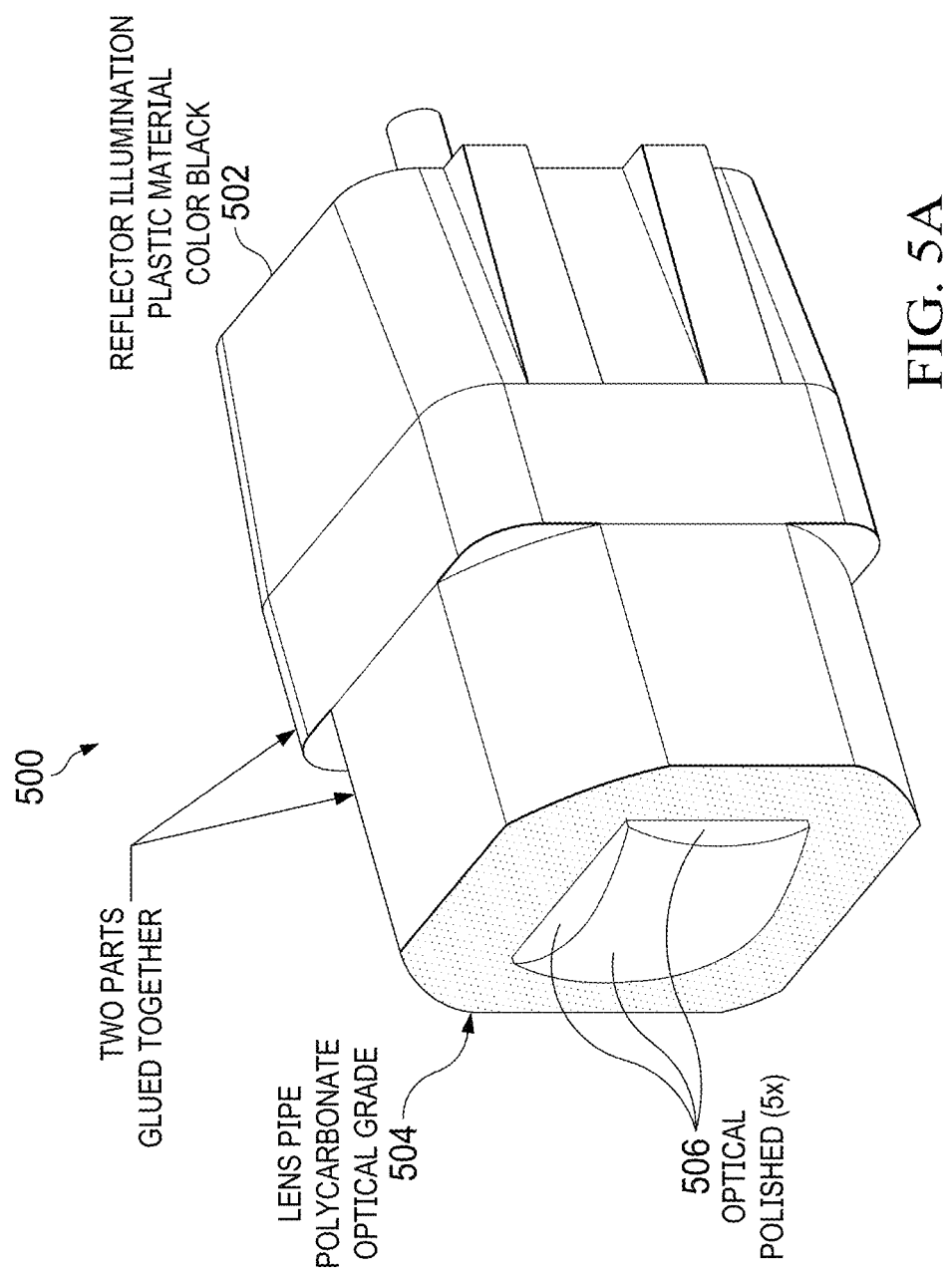
FIG. 5A is an illustration of an illustrative illumination unit configured as a two component assembly.

With regard to FIG. 5A, an illustration of an illustrative lens pipe 500 configured as a two component assembly is shown. The components of the illumination unit 500 may include a reflector and illuminator component 502 and a lens pipe component 504. In an embodiment, the reflector and illuminator component 502 may be formed of plastic material and optionally be a black color so as to absorb stray light. The lens pipe component 504 may be formed of polycarbonate that is optical grade to provide structural stability for optical components and surfaces defined thereby. The lens pipe component 504 may be configured to support a projection lens 506, where the projection lens 506 may be optically polished without surface features. Alternative configurations of the projection lens 506 are contemplated. In an embodiment, the reflector and illuminator component 502 and lens pipe component 504 may be connected to one another by an adhesive, such as glue, or other attachment means (adhesives or otherwise), as understood in the art. By forming the illumination unit 500 with only two components, manufacturing of the illumination unit 500 is cost effective. Other numbers of component assemblies are possible.

Figure 5B:
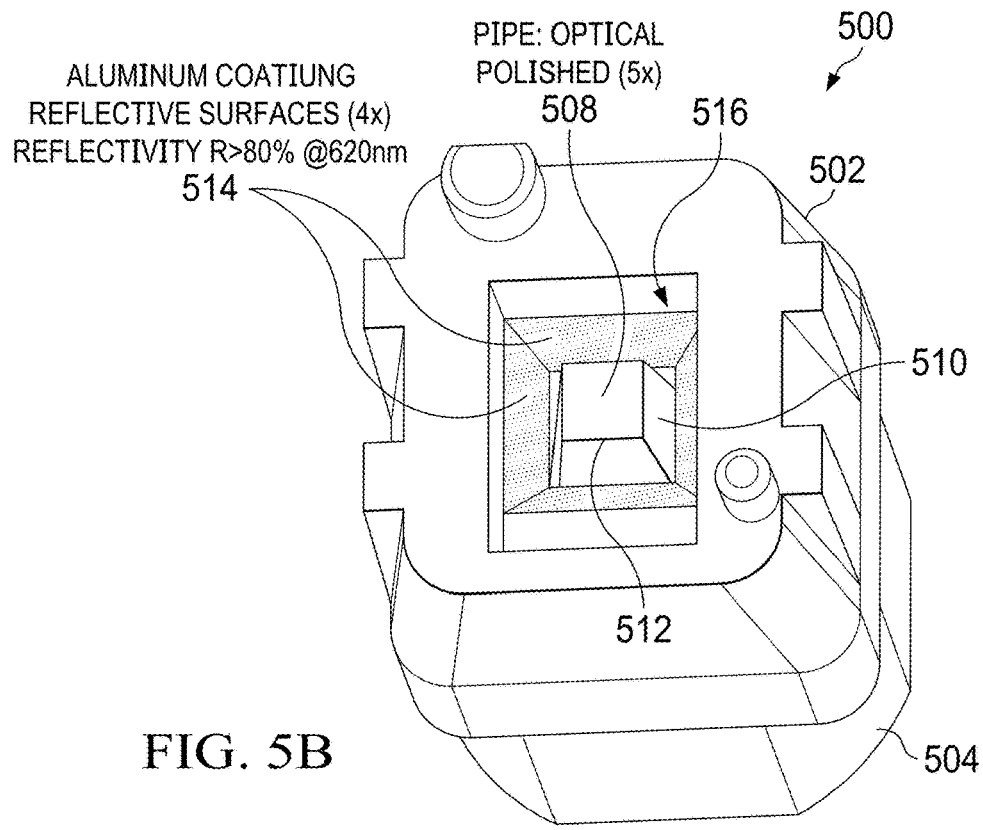
FIG. 5B is an illustration of another view of the two component assembly of the illumination unit of FIG. 5A.

With regard to FIG. 5B, an illustration of another view of the two component assembly of the illumination unit 500 of FIG. 5A is shown. The illuminator component 502 is shown to include a lens pipe 508 disposed therein. The lens pipe 508 may have tapered sidewalls 510 and have an input aperture 512 via which light from an illumination source (not shown) may enter. The input aperture 512 may be an opening defined by the tapered sidewalls or be a window through which light is input into the lens pipe 508. Inside surfaces of the sidewalls 510 of the lens pipe 508 may be optically polished to achieve total internal reflection without any losses in the lens pipe. Disposed adjacent to the lens pipe 508 may be reflective surfaces 514, in this case four reflective surfaces. Each of the reflective surfaces 514 may have a reflective coating that provides for a reflectivity coefficient of above about 80% at 620 nm. It should be understood that other reflectivity coefficients may be utilized. An illumination source chip in a chip package (not shown) may be disposed within a socket region 516 and directed toward the input aperture 512 of lens pipe 508, as previously described.

Figure 5C:
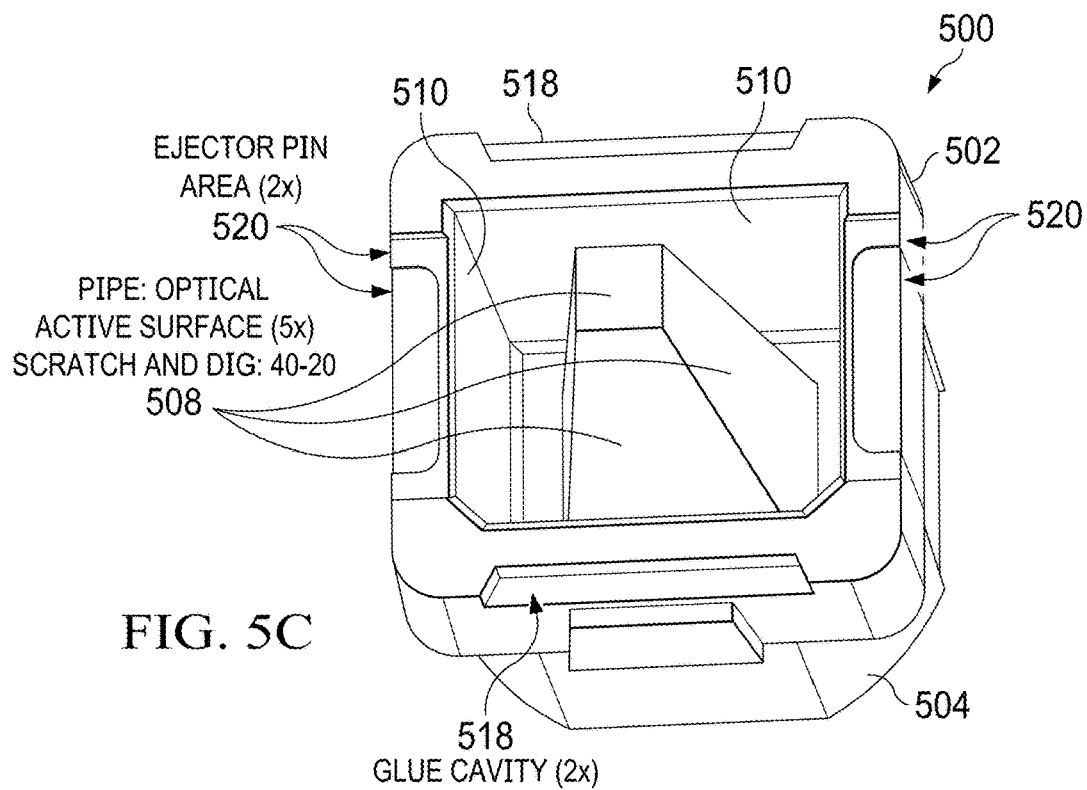
FIG. 5C is an illustration of a zoomed-in view of a lens pipe component of FIG. 5A.

With regard to FIG. 5C, an illustration of a zoomed-in view of the lens pipe component 504 showing the lens pipe 508 of FIG. 5B is shown. The lens pipe component 504 includes glue cavities 518 that may be used to secure the lens pipe component 504 and illuminator component 502 together. An ejector pin area 520 may also be disposed on the lens pipe component 504 to enable separation from the mold.

Figure 6:
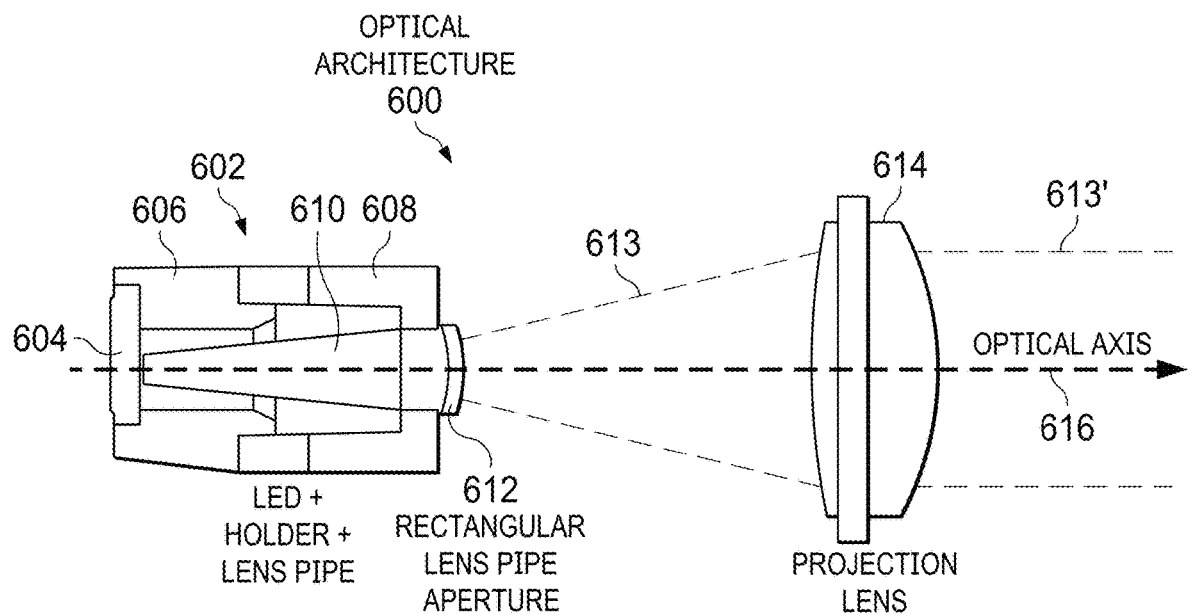
FIG. 6 is an illustration of an illustrative optical architecture inclusive of an illumination unit inclusive of an illuminator (e.g., LED chip) of an illumination component connected to a lens pipe component.

With regard to FIG. 6, an illustration of an illustrative optical architecture 600 inclusive of an illumination unit 602 inclusive of an illuminator 604 (e.g., LED chip) of an illumination component 606 connected to a lens pipe component 608 is shown. The lens pipe component 608 may include a lens pipe 610 that extends toward a rectangular lens pipe output aperture 612. Light 613 that projects from the rectangular lens pipe aperture 612 is projected to a projection lens 614 that projects light 613' along an optical axis 616 for reading a machine-readable indicia at long distances and that is eye safe.

Figure 7A:
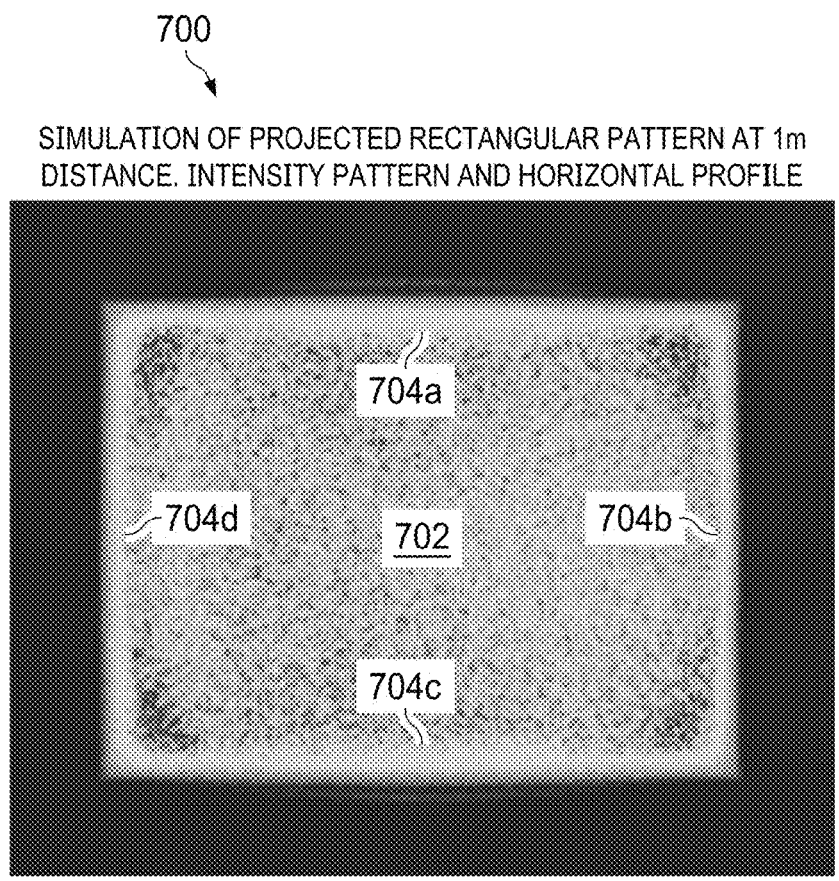
FIG. 7A is an illustration of an illustrative projected rectangular light pattern at a 1 m distance.

With regard to FIG. 7A, an illustration of an illustrative projected rectangular light pattern 700 at a distance of 1 m is shown. An intensity pattern 702 is shown to be substantially uniform in the rectangular light pattern 700 between edges 704a-704d (collectively 704). By having a substantially homogeneously illumination or uniform intensity pattern 702, light spots with high irradiance may be avoided. That is, light spots with peak irradiance that are typical produced by conventional illumination units (see FIG. 11, for example) may be avoided, thereby reducing the peak energy at any location within the rectangular light pattern 700. A comparison between an illumination pattern produced by a conventional illumination device versus an illumination device described herein can be best understood from FIG. 7B, which shows illumination light patterns at different distances from a plane of the projection lens 614.

Figure 7B:
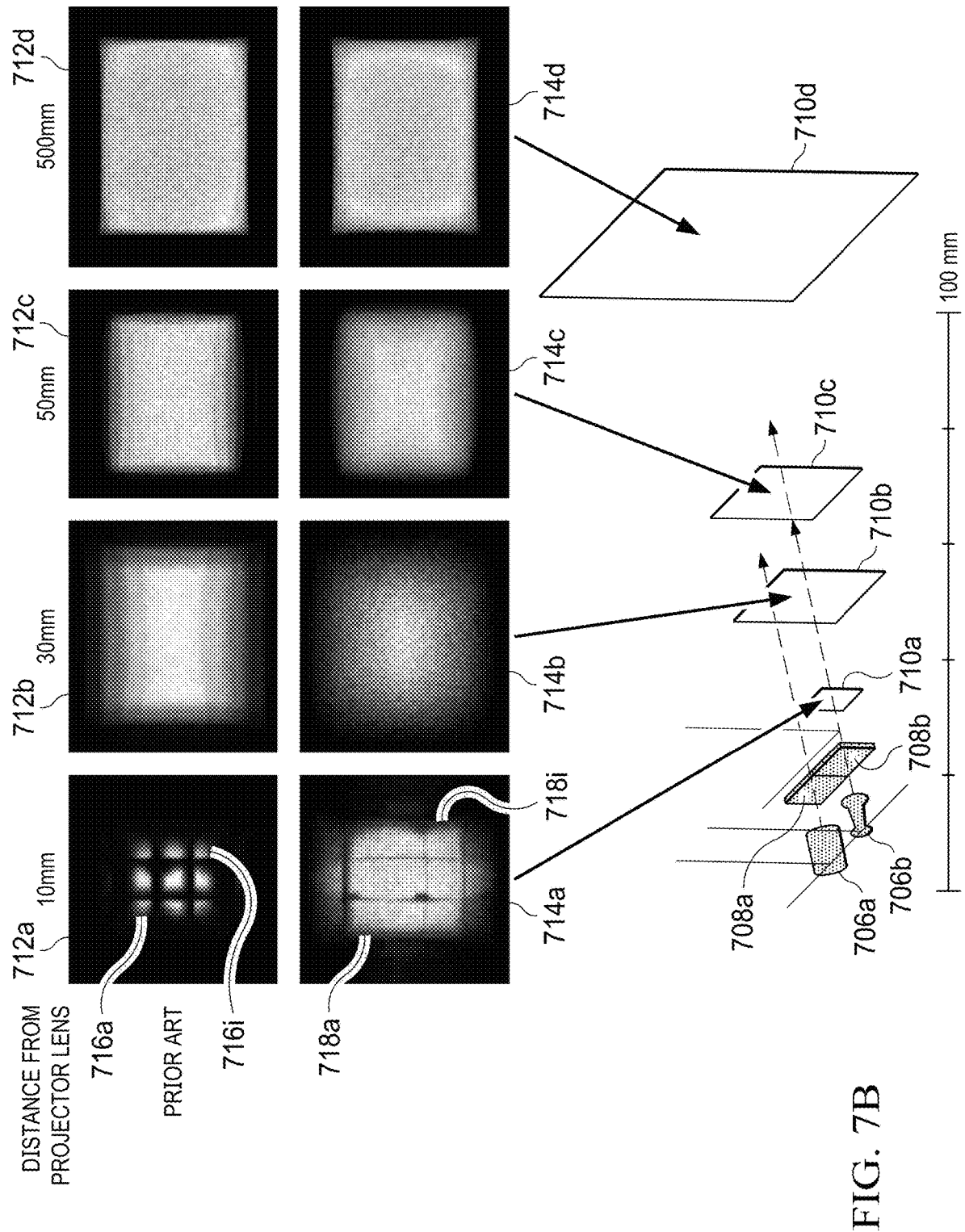
FIG. 7B is an illustration of an illustrative portions of (i) a prior art imaging system and (ii) an imaging system according to the principles described herein.

With regard to FIG. 7B, an illustration of an illustrative portions of (i) a prior art imaging system 706a and (ii) an imaging system 706b according to the principles described herein are shown. Each of the portions of imaging systems 706a and 706b may have projection lenses 708a and 708b through which light is projected, as previously described. Four image planes 710a-710d (collectively 710) at distances of 10 mm, 30 mm 50 mm and 500 mm at which respective conventional images 712a-712d (collectively 712) and images 714a-714d (collectively 714) are measured are shown. The conventional image 712a is shown to have light spots 716a-716i (collectively 716) that result from "mirroring" or internal reflection of an entire light source that is smaller than an input aperture of a lens pipe. Conversely, light regions 718a-718i (collectively 718) are shown to have light spread or dispersed across a larger region as a result of the light source extending across the entire input aperture of a lens pipe. The light spots 716 and light regions 718 may have approximately the same amount of total irradiance, but the peak irradiance at each of the light spots 716 is higher than the peak irradiance of the light regions 718. As the light spots 716 extend to each of the images 712b, 712c, and 712d, the peak irradiance of the portion of the conventional imaging system 706a can be seen, especially in image 712b, with density of the light being higher than the density of the light in image 714b of the portion of the imaging system 706b presented herein. Despite the light in the conventional images 712c and 712d appearing to diffuse, the peak irradiance from the light spots 716 may continue to be higher than peak irradiance in images 714c and 714d from light regions 718. As such, the ability and risk for a retina of an eye of a user to be damaged is much lower using an imaging system as described herein as compared to a conventional imaging system.

Figure 8:
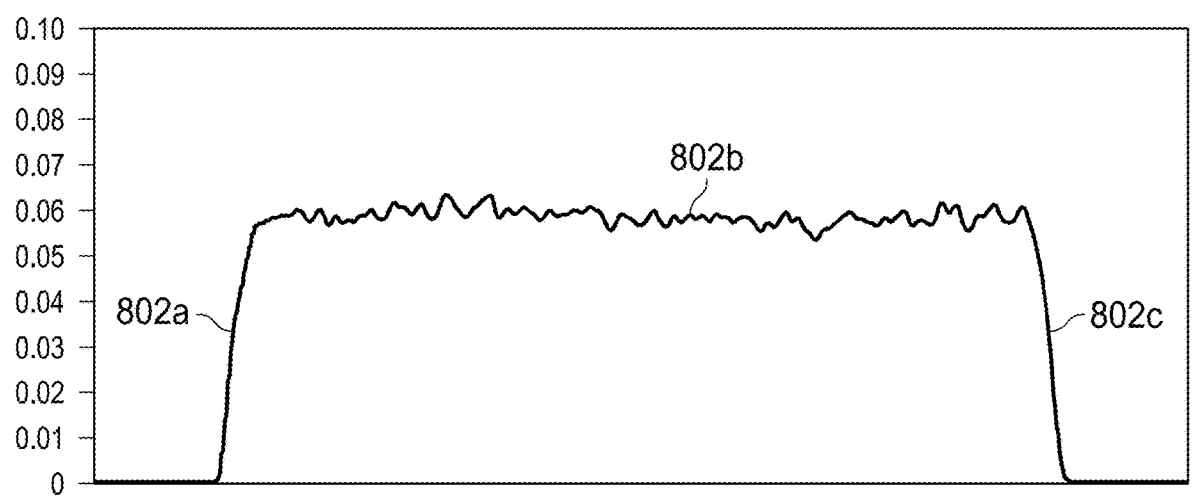
FIG. 8 is a graph of an illustrative optical irradiance curve.

With regard to FIG. 8, a graph of an illustrative optical irradiance profile 800 is shown. The optical irradiance profile 800 includes a first edge 802a, a horizontal signal portion 802b, and a second edge 802c. The horizontal signal portion 802b is representative of an intensity pattern that has homogeneous illumination and irradiation across a rectangular light pattern, such as the rectangular light pattern 700 of FIG. 7, that extends from the first edge 802a to the second edge 802c that defines a width of the rectangular light pattern. As shown, the horizontal signal portion 800b is substantially uniform (i.e., no significant spikes or dips), which indicates that no light spots are generated. The leading and trailing edges 802a and 802c are relatively steep, which is indicative that edges that define the rectangular light pattern are well defined, as shown in FIG. 10.

Figure 9:
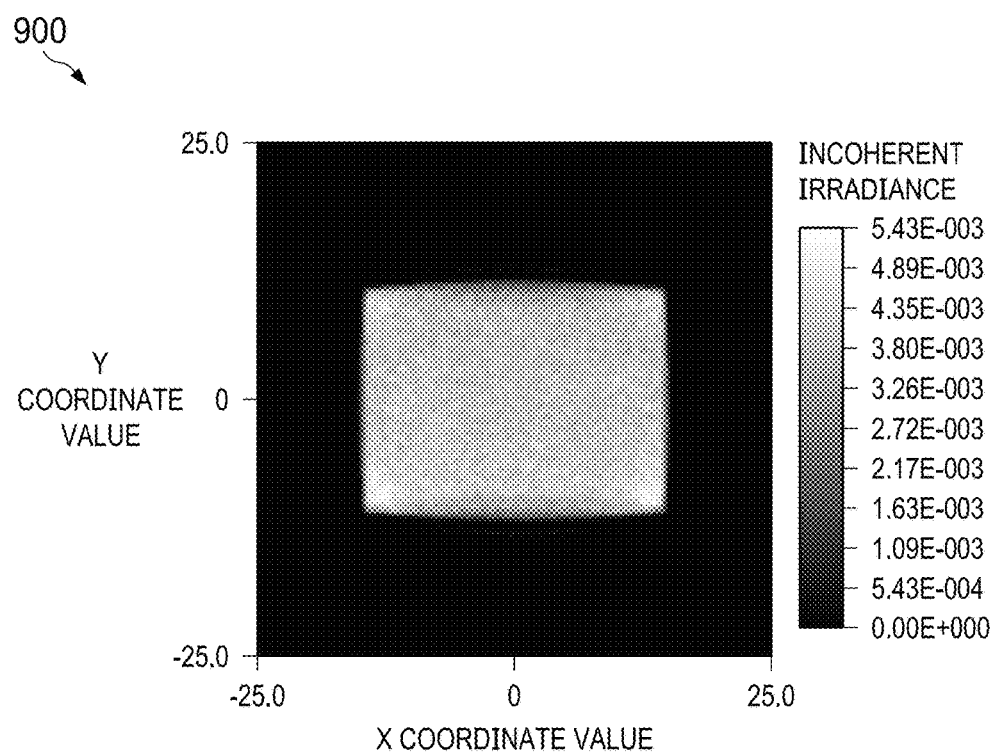
FIG. 9 is an illustration of an illustrative intensity map at 10 cm from a prior art illumination unit.

With regard to FIG. 9, an illustration of an illustrative output image 900 from an optical detector showing an intensity map at 10 cm from a prior art illumination unit is shown. While the output image 900 is rectangular, it is seen that irradiance intensity edges 902 of the rectangular output image 900 are not well defined. As a result, imaging of machine-readable indicia is not as precise as when irradiance intensity forms a more definite edge of a rectangular light pattern (see FIG. 10).

Figure 10:
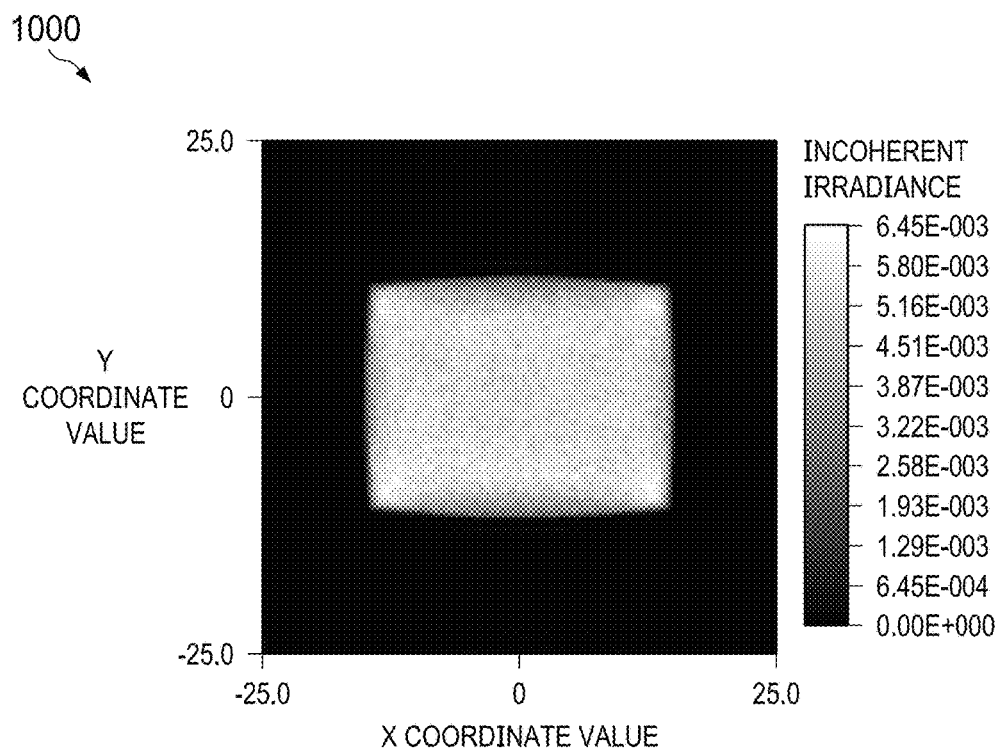
FIG. 10 is an illustration of an illustrative intensity map at 10 cm from an illumination unit provided herein.

With regard to FIG. 10, an illustration of an illustrative output image 1000 from an optical detector showing an intensity map at 10 cm from an illumination unit provided herein is shown. In this case, the output image 1000 is rectangular and irradiance intensity edges 1002 of the rectangular output image 1000 are well defined. As a result, imaging of machine-readable indicia is more precise than possible with a conventional illumination unit that produces less defined irradiance intensity edges, such as shown in FIG. 9.

With regard to FIG. 11, an intensity map 1100 of light projected from a prior art illumination unit as would be seen on a retina of a human eye is shown. The intensity map 1100 shows that nine light spots 1102a-1102i (collectively 1102) are produced in a rectangular shape. Other number of light spots, such as five as shown in FIG. 2C, are possible based on a configuration of the optical system. The spots 1102 are formed as a result of an illumination source being smaller than an input aperture of a lens pipe. In this case, peak irradiance of the light spots 1102 is shown to be about 28 mWatts/cm$^2$ with a total power of about 0.024 mWatts.

With regard to FIG. 12, an intensity map 1200 of light projected from an illumination unit as described herein is shown. The intensity map 1200 shows a large light spot 1202. Peak irradiance across the intensity map 1200 is about 5 mWatts/cm$^2$, and total power of about 0.024 mWatts. Surprisingly, while the total power of the two illumination units are about the same (i.e., about 0.024 mWatts), the peak irradiance of the light spots produced by a prior art illumination unit is about 5 times higher than the peak irradiance produced by an illumination unit that produces a homogeneous distribution of illumination.

Figure 13:
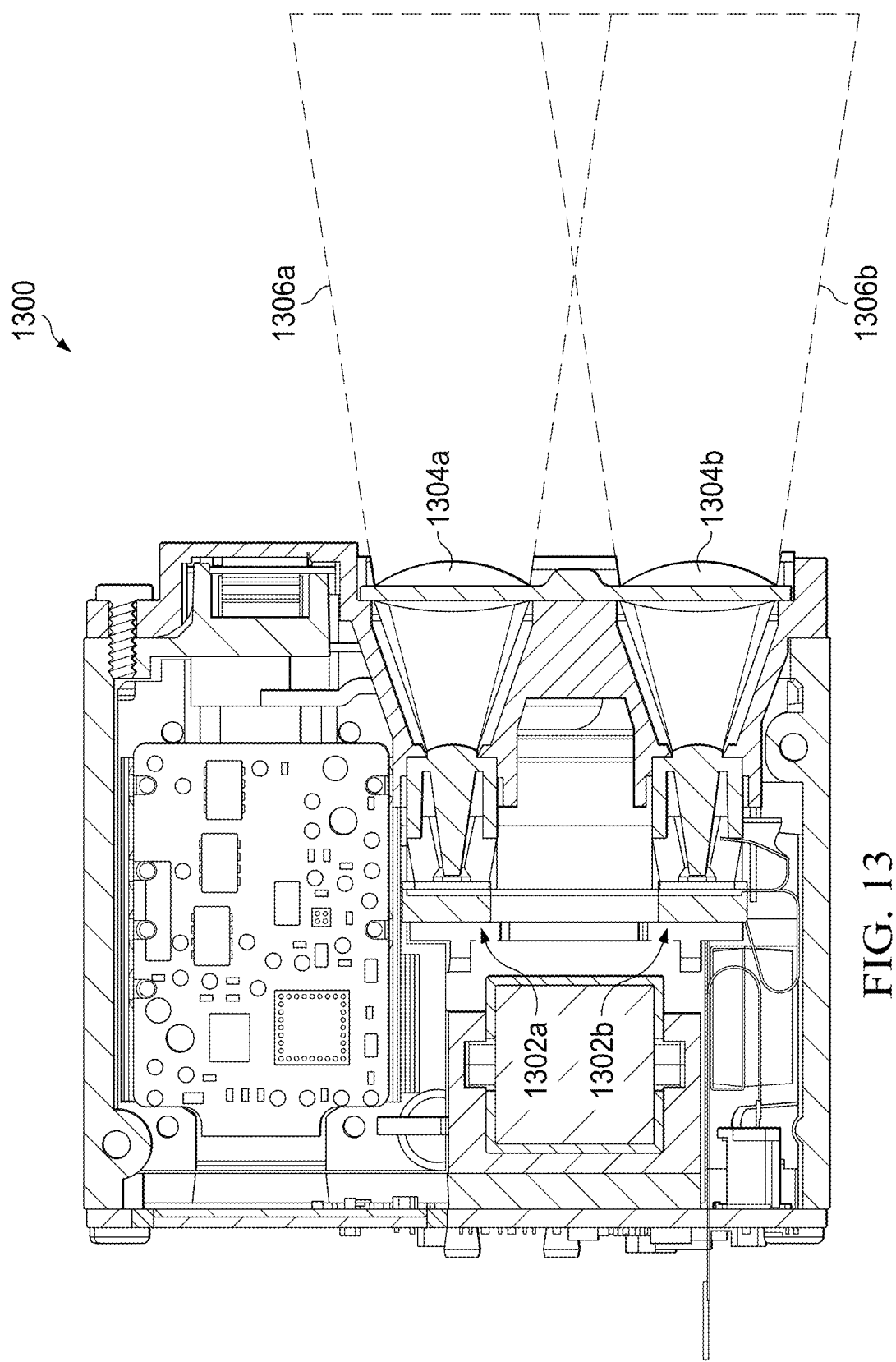
FIG. 13 is an illustration of an illustrative barcode reader inclusive of a pair of illumination units with high efficiency and eye safe light beams.

With regard to FIG. 13, an illustration of an illustrative barcode reader 1300 inclusive of a pair of illumination units 1302a and 1302b (collectively 1302) is shown The illumination units 1302 project light with dispersed illumination and irradiance across a rectangular light pattern via respective projection lenses 1304a and 1304b to produce light beams 1306a and 1306b (collectively 1306) to read machine-readable indicia at a long distance, such as farther than 10 meters. The light beams may be narrow (e.g., 14 degree angle), and be efficient while being eye safe due to the irradiance being distributed across the light pattern from each of the light beams 1306.

Figure 14:
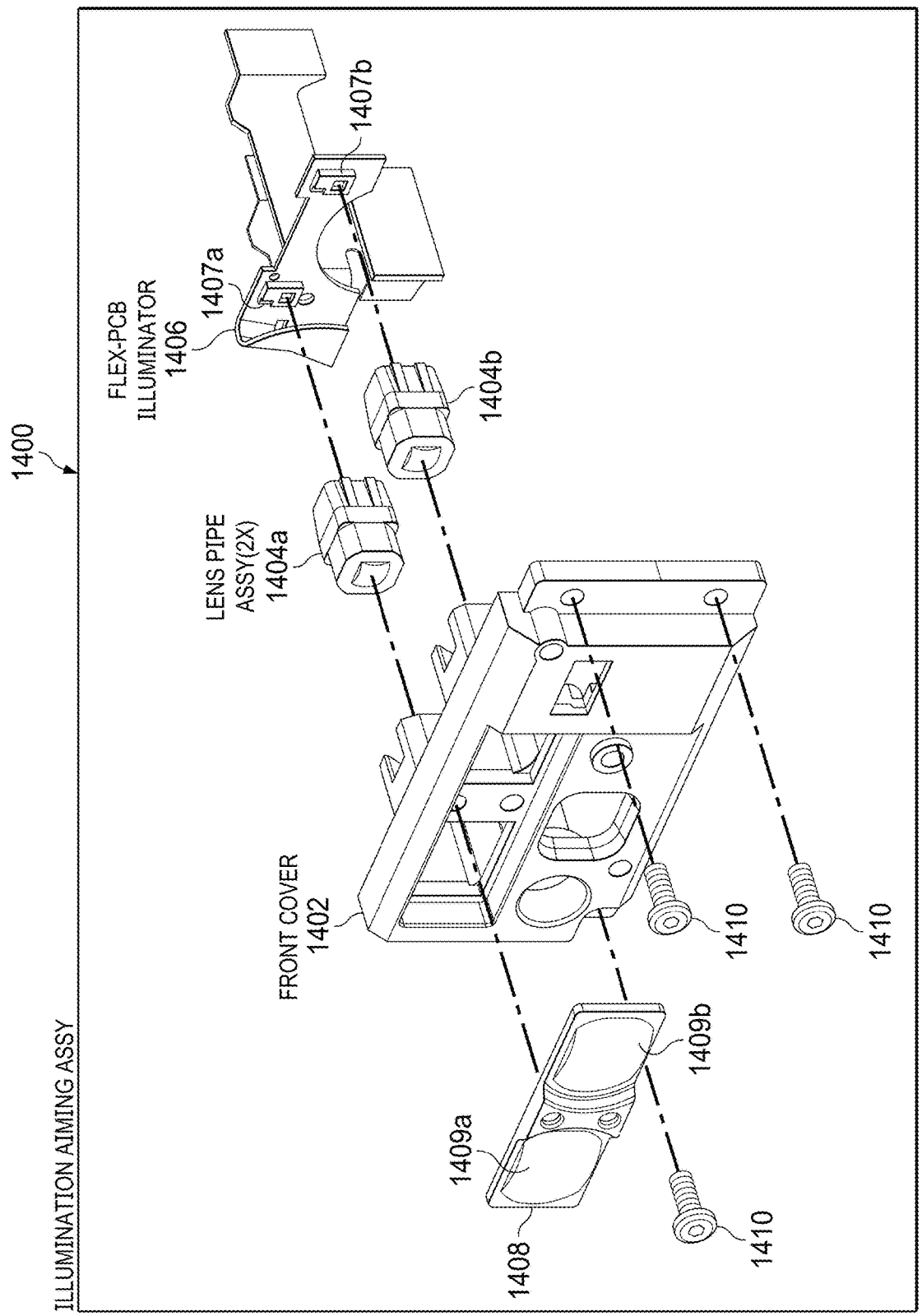
FIG. 14 is an exploded view illustration of an illustrative illumination aiming assembly.

With regard to FIG. 14, an exploded view illustration of an illustrative illumination aiming assembly 1400 is shown. The illumination aiming assembly 1400 is shown to include a front cover 1402 that may be configured to support a pair of lens pipe assemblies 1404a and 1404b. An illuminator 1406 with a pair of illumination sources 1407a and 1407b (collectively 1407) may be aligned to project light through the lens pipe assemblies 1404. The illumination sources 1407 may be formed by LED chips. In an embodiment, the illuminator 1406 may be a single component, thereby simplifying assembly. A projection lens component 1408 inclusive of a pair of projection lenses 1409 may be connected to the front cover 1402, and flush with the outer surface thereof to minimize space occupancy in an axial direction. The projection lens component 1408 having both projection lenses 1409 as part of a single element simplifies assembly of the illumination aiming assembly 1400. Fastening components, such as screws, may be used to attach the front cover to a barcode reader, such as the barcode reader 1300 of FIG. 13.

Figure 15:
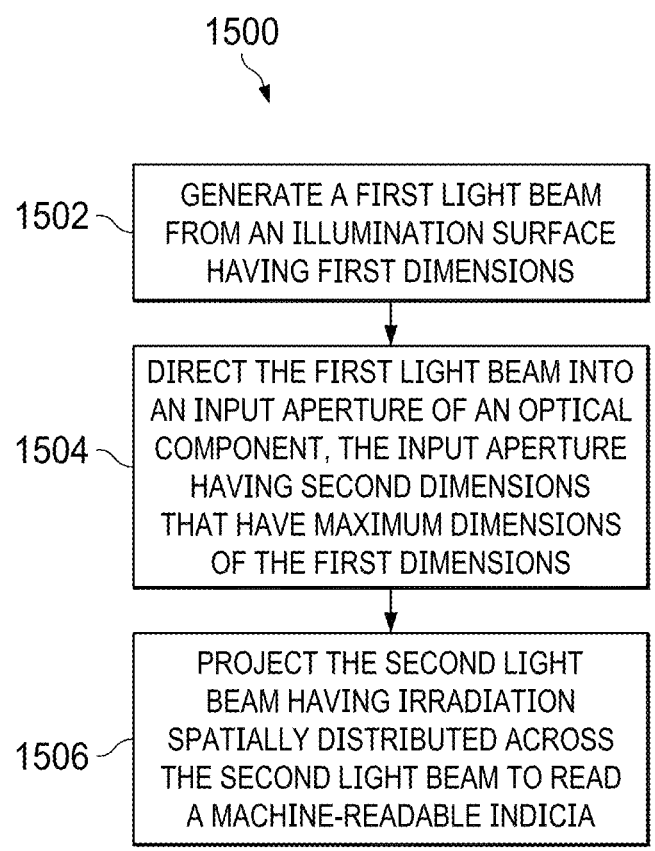
FIG. 15 is an illustration of an illustrative process for producing a light for long distance machine-readable indicia with a homogeneous distribution of illumination to avoid eye injury.

FIG. 15 is an illustration of an illustrative process 1500 for producing a light for long distance machine-readable indicia with a homogeneous distribution of illumination to avoid eye injury. The process 1500 may start at step 1502 to generate a first light beam from an illumination surface having first dimensions. At step 1504, the first light beam may be directed into an input aperture of an optical component to form a second light beam. The input aperture has second dimensions, where the first dimensions are at least as large as the second dimensions. At step 1506, the second light beam having irradiation spatially distributed across the second light beam may be projected to read a machine-readable indicia.

In an embodiment, light not initially part of the first light beam may be reflected back toward a light source that produced the first light beam to reflect light not initially projected into the input aperture so as to become part of the first light beam, where the reflected light increases efficiency of the reading the machine-readable indicia. The first light beam may be directed into an input aperture that is rectangular or square. The first light beam that entered the input aperture may be directed between a set of tapered walls, where the set of tapered walls expand from the input aperture to an output aperture. The second light beam may be directed along a second optical axis.

The second light beam may be projected as a rectangular light beam defined by a rectangular shape of the output aperture. The process may perform second generating, directing, and projecting of a third light beam in both time and physical dimension in parallel to the generating, directing, and projecting to read the machine-readable indicia. A second projecting includes projecting the second and third light beams along parallel optical axes may be performed. The second and third light beams may at least be projected to partially intersect with one another. Projecting a second light beam may include projecting a second light beam with a peak irradiance if projected on a human eye retina below about 10 mW/square-centimeters.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A barcode reader, comprising:
a forward facing illumination source having an illumination surface that illuminates toward an exit window, the illumination source having a surface area with first dimensions;
a lens pipe having a tapered shape extending from a first end to a second end, the first end defining an input aperture having second dimensions less than the first dimensions of the surface area of the illumination source;
a reflector positioned radially around the input aperture of the lens pipe, and angled relative to the illumination source to reflect light produced by the illumination source that illuminates outside of the input aperture of the lens pipe back to the illumination surface of the illumination source to cause at least a portion of the reflected light to reflect from the illumination surface into the input aperture; and
a projection lens disposed in front of the second end of the lens pipe, and configured to project the light from the illumination source that enters the input aperture of the lens pipe substantially along an optical axis defined by the projection lens.

2. The barcode reader according to claim 1, wherein the lens pipe has a rectangular output aperture at the second end aligned with the projection lens.

3. The barcode reader according to claim 1, wherein the reflector is connected to both an outside portion of the lens pipe and packaging of the illumination source, thereby preventing light from exiting outside of the input aperture of the lens pipe.

4. The barcode reader according to claim 3, wherein the reflector is planar.

5. The barcode reader according to claim 3, wherein the reflector includes an aluminum coating.

6. The barcode reader according to claim 3, wherein the reflector is concave.

7. The barcode reader according to claim 1, further comprising:
a second forward-facing illumination source having an illumination surface that illuminates from a surface area with first dimensions;
a second lens pipe having a tapered shape extending from a first end to a second end, the first end defining an input aperture having second dimensions that at most equal to the first dimensions of the second illumination source; and
a second projection lens disposed in front of the second end of the lens pipe, and configured to project the light from the second illumination source that enters the input aperture of the second lens pipe substantially along a second optical axis defined by the second projection lens.

8. The barcode reader according to claim 1, wherein the illumination source includes a package having a reflectance level above 30%.

9. The barcode reader according to claim 1, wherein the reflector has a surface exhibiting a reflectivity coefficient of at least 80% at 620 nm.

10. A barcode reader comprising:
a forward facing illumination source having an illumination surface that illuminates toward an exit window, the illumination source having a surface area with first dimensions;
a lens pipe having a tapered shape extending from a first end to a second end, the first end defining an input aperture having second dimensions that are at most equal to the first dimensions of the surface area of the illumination source;

a projection lens disposed in front of the second end of the lens pipe, and configured to project the light from the illumination source that enters the input aperture of the lens pipe substantially along an optical axis defined by the projection lens;

a second forward-facing illumination source having an illumination surface that illuminates from a surface area with first dimensions;

a second lens pipe having a tapered shape extending from a first end to a second end, the first end defining an input aperture having second dimensions that at most equal to the first dimensions of the second illumination source; and a second projection lens disposed in front of the second end of the lens pipe, and configured to project the light from the second illumination source that enters the input aperture of the second lens pipe substantially along a second optical axis defined by the second projection lens, wherein the light projected from the projection lens and the second projection lens at least partially intersect.

11. The barcode reader according to claim 1, wherein the first and second projection lenses are disposed on a single component that is attached to the barcode reader.

12. A method of imaging barcodes, comprising:

generating a first light beam from a forward-facing illumination surface having first dimensions;

directing the first light beam into an input aperture of an optical component to form a second light beam, the input aperture having second dimensions, the first dimensions of the illumination surface being greater than the second dimensions of the input aperture of the optical component;

reflecting, light generated by the illumination surface that produced the first light beam back toward the illumination surface to reflect light not initially projected into the input aperture so as to become part of the first light beam directed into the input aperture, the reflected light increasing efficiency of the reading the machine-readable indicia; and projecting the second light beam having irradiation spatially distributed across the second light beam through a projection lens to read a machine-readable indicia.

13. The method according to claim 12, wherein directing the first light beam into an input aperture includes directing the first light beam into a rectangular input aperture.

14. The method according to claim 13, further comprising directing the first light beam that entered the input aperture between a set of tapered walls, the set of tapered walls expanding from the input aperture to an output aperture.

15. The method according to claim 14, further comprising causing the second light beam to be directed along a second optical axis.

16. The method according to claim 14, wherein projecting the second light beam includes project in the second light beam as a rectangular light beam defined by a rectangular shape of the output aperture.

17. The method according to claim 12, further comprising performing second generating, directing, and projecting a third light beam in both time and physical dimension in parallel to the generating, directing, and projecting to read the machine-readable indicia.

18. The method according to claim 17, wherein performing a second projecting includes projecting the second and third light beams along parallel optical axes.

19. The method according to claim 18, wherein projecting the second and third light beams include projecting the second and third light beams so as to at least partially intersect one another.

20. The method according to claim 12, wherein projecting a second light beam includes projecting a second light beam with a peak irradiance below about 10 mW/square-centimeters.

* * * * *